United States Patent
Hayashi et al.

(10) Patent No.: US 8,563,163 B2
(45) Date of Patent: Oct. 22, 2013

(54) TOOL BATTERIES

(75) Inventors: Hidekazu Hayashi, Anjo (JP); Eiji Kondo, Anjo (JP); Hironori Ogura, Anjo (JP); Hideyuki Taga, Anjo (JP)

(73) Assignee: Makita Corporation, Anjo-Shi (JP)

( * ) Notice: Subject to any disclaimer, the term of this patent is extended or adjusted under 35 U.S.C. 154(b) by 0 days.

(21) Appl. No.: 13/207,767

(22) Filed: Aug. 11, 2011

(65) Prior Publication Data

US 2012/0045678 A1 Feb. 23, 2012

(30) Foreign Application Priority Data

Aug. 20, 2010 (JP) ................................. 2010-184989

(51) Int. Cl.
*H01M 2/00* (2006.01)

(52) U.S. Cl.
USPC .......................................................... 429/163

(58) Field of Classification Search
None
See application file for complete search history.

(56) References Cited

U.S. PATENT DOCUMENTS

2007/0243458 A1  10/2007  Roehm et al.

FOREIGN PATENT DOCUMENTS

| EP | 0 994 523 | 4/2000 |
| EP | 1 309 019 A2 | 5/2003 |
| EP | 1 973 181 A1 | 9/2008 |
| JP | A-2001-229895 | 8/2001 |

OTHER PUBLICATIONS

Oct. 31, 2011 Search Report issued in European Patent Application No. 11177964.1.

*Primary Examiner* — Patrick Ryan
*Assistant Examiner* — Wyatt McConnell
(74) *Attorney, Agent, or Firm* — Oliff & Berridge, PLC

(57) ABSTRACT

A battery housing of a tool battery has a hook accommodation chamber and a battery cell accommodation chamber defined therein. A hook is accommodated within the hook accommodation chamber and is operable to lock and unlock the tool battery against a tool body of a power tool. Battery cells are disposed within the battery cell accommodation chamber. The hook accommodation chamber and the battery cell accommodation chamber are partitioned from each other.

12 Claims, 8 Drawing Sheets

TOOL BATTERIES

This application claims priority to Japanese patent application serial number 2010-184989 and, the contents of which are incorporated herein by reference.

BACKGROUND OF THE INVENTION

1. Field of the Invention

The present invention relates to tool batteries, and in particular to tool batteries that can be connected to tool bodies of electric tools.

2. Description of the Related Art

A known tool battery has a book for locking against a tool body of an electric tool when the tool battery is moved to slide along the tool body in a given direction. In this connection, a battery housing of the battery has an opening, through which a lock claw of the book can protrude to the outside of the battery housing. The battery housing has another opening, where an operation member for releasing the lock condition caused by the hook is exposed to the outside.

This type of tool batter is disclosed, for example, in Japanese Laid-Open Patent Publication No. 2001-229895. FIGS. 10(A) and 10(B) show a tool battery disclosed in this publication. Referring to FIGS. 10(A) and 10(B), a tool battery 100 can be connected to a tool body 110 of an electric power tool by moving the tool battery 100 along the tool body 110 in the state that a front end (right end as viewed in FIG. 10(B)) of a slide rail 102 of the tool battery 100 is engaged with a battery connecting portion 112 of the tool body 110. A hook 105 is positioned at the left end of the battery housing 101 and can lock the tool battery 100 against the tool body 110 not to slide relative thereto when the tool battery 100 and the tool body 110 have been connected to each other. The hook 105 has a lock claw 105r and an operation portion 105x and is normally biased upward by a coil spring 106. The lock claw 105r can protrude upwardly from an opening 101h formed in the upper surface of the battery housing 101. The operation portion 105x is operable for releasing a lock condition achieved by the lock claw 105r and is exposed at an opening 101y formed in the left side surface of the battery housing 101.

Therefore, when the tool battery 100 is slide relative to the tool body 110 to reach the right and position as shown in FIG. 10(B), the lock claw 105r of the hook 105 protrudes upward from the opening 101h of the battery housing 101 by the force of the coil spring 106 and engages a lock wall surface formed on the tool body 110. Therefore, the tool battery 100 is locked against the tool body 110 not to slide relative thereto.

When the user presses the operation portion 105 of the hook 105, which is exposed at the opening 101y of the battery housing 101, against the force of the coil spring 106, the lock claw 105r moves not to protrude from the opening 101h, so that the lock condition of the tool battery 100 is released.

As described above, in the battery housing 101 of the tool battery 100, there are provided the opening 101h, through which the lock claw 105r of the hook 105 can protrude upward, and the opening 101y for enabling the operation of the operation portion 105x of the hook 105 for releasing the lock condition. Therefore, in the even that the tool battery 100 gets wet with rain, etc., it may be possible that water enters the battery housing 101 from the openings 101h and 101y. Because there is no partition between a space where the hook 105 is stored and a space where battery cells (not shown) are stored, water entering the battery housing 101 may reach the battery cells. If this occurs, the battery cells may be short-circuited to cause failure of the tool battery 100.

Therefore, there is a need in the art for a tool battery that may not cause a substantial problem even in the event that the tool battery gets wet.

SUMMARY OF THE INVENTION

According to the present teaching, a battery housing of a tool battery has a hook accommodation chamber and a battery cell accommodation chamber defined therein. A hook is accommodated within the hook accommodation chamber and is operable to lock and unlock the tool battery against a tool body of a power tool. Battery cells are disposed within the battery cell accommodation chamber. The hook accommodation chamber and the battery cell accommodation chamber are partitioned from each other. Therefore, even in the event that water accidentally enters the hook accommodation member, water may be prevented or inhibited from entering from the hook accommodation chamber into the battery cell accommodation chamber.

DETAILED DESCRIPTION OF THE INVENTION

Figure 1:
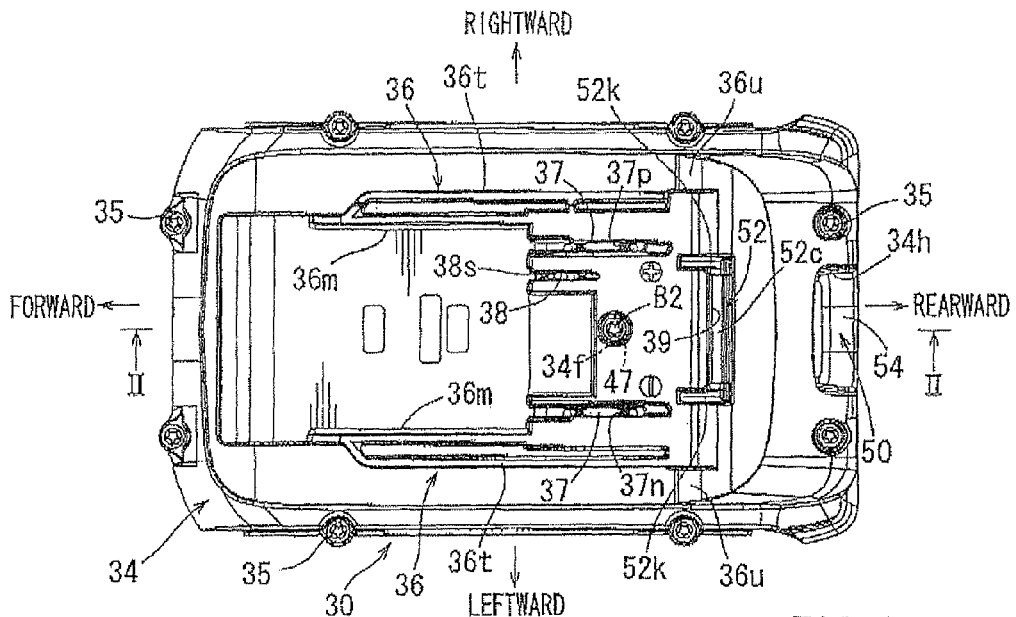
FIG. 1 is a plan view of a tool battery according to a representative example.

Each of the additional features and teachings disclosed above and below may be utilized separately or in conjunction with other features and teachings to provide improved tool batteries. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one example, a tool battery includes a battery housing. The battery housing includes a slide connection mechanism and a hook. The slide mechanism is configured to slidably connect the tool battery to a tool body of a power tool. The hook is disposed within the battery housing and has a lock claw and an operation portion. The lock claw is configured to lock the battery housing against the tool body not to slide relative thereto. The operation portion is operable to release the lock claw from locking against the tool body. The battery housing has a claw opening and an operation opening. The claw opening permits the lock claw from protruding to the outside of the battery housing via the claw opening. The operation opening permits the operation portion from being exposed to the outside of the battery housing via the operation opening. The tool battery further includes a hook accommodation chamber and a battery cell accommodation chamber defined within the battery housing. The hook accommodation chamber accommodates the hook such that the hook can move between a lock position where the lock claw protrudes from the claw opening and a lock releasing position where the lock claw does not protrude from the claw opening. The battery cell accommodation chamber accommodates battery cells. The hook accommodation chamber and the battery cell accommodation chamber are partitioned from each other, so that when water enters the hook accommodation chamber, water is prevented from entering further into the battery cell accommodation chamber.

Because the hook accommodation chamber is disposed within the battery housing such that the hook can move between the lock position where the lock claw protrudes from the claw opening and the lock releasing position where the lock claw does not protrude from the claw opening, water entering the battery housing via the claw opening and/or the operation opening may be stored within the hook accommodation chamber. In addition, because the hook accommodation chamber and the batter cell accommodation chamber are partitioned from each other, water entering the hook accommodation chamber may not reach the battery cells disposed within the battery cell accommodation chamber. As a result, it is possible to prevent the tool battery from causing any trouble due to adhesion of water to the battery cells.

The tool battery may further include an electrode accommodation chamber defined within the battery housing and accommodating electrodes for connecting with corresponding terminals of the power tool body. The electrode accommodation chamber and the battery cell accommodation chamber are partitioned from each other, so that when water enters the electrode accommodation chamber, water is prevented from entering further into the battery cell accommodation chamber. The hook accommodation chamber and the electrode accommodation chamber may communicate with each other.

With this arrangement, even in the event that water enters the electrode accommodation chamber, water may not reach the battery cells disposed within the battery cell accommodation chamber. In addition, water entering the electrode accommodation chamber can be introduced into the hook accommodation chamber.

A discharge hole may be formed in a bottom portion of the hook accommodation chamber, so that water entering the hook accommodation chamber is discharged from the hook accommodation chamber via the discharge hole. Therefore, water may be rapidly discharged from the hook accommodation chamber to the outside.

The tool battery may further include a hook accommodation member. The hook accommodation member is a separate member from the battery housing and is fitted into the battery housing, so that the hook accommodation chamber is defined by the hook accommodation member as a substantially closed space. The hook accommodation chamber may be defined solely by the hook accommodation member or may be defined by the hook accommodation member and a part of an inner wall of the battery housing opposed to the hook accommodation member. Therefore, the hook accommodation chamber can be easily formed in comparison with the case where the hook accommodation member is formed integrally with the battery housing.

<Representative Example>

A representative example will now be described with reference to FIGS. 1 to 9, which show a tool battery according to the representative example. Directions "upward", "downward", "leftward", "rightward", "forward" and "rearward" indicated in these figures are the directions of the tool battery when the tool battery is positioned with its bottom oriented downward.

General Construction of Tool Battery

Figure 2:
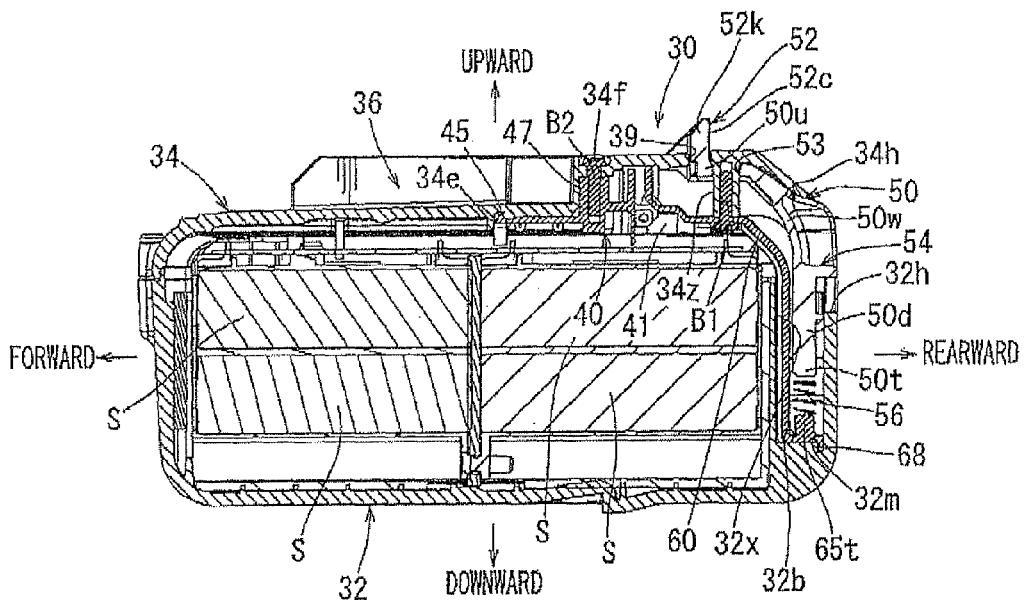
FIG. 2 is a vertical sectional view of the tool battery taken along line II-II in FIG. 1.
Figure 3:
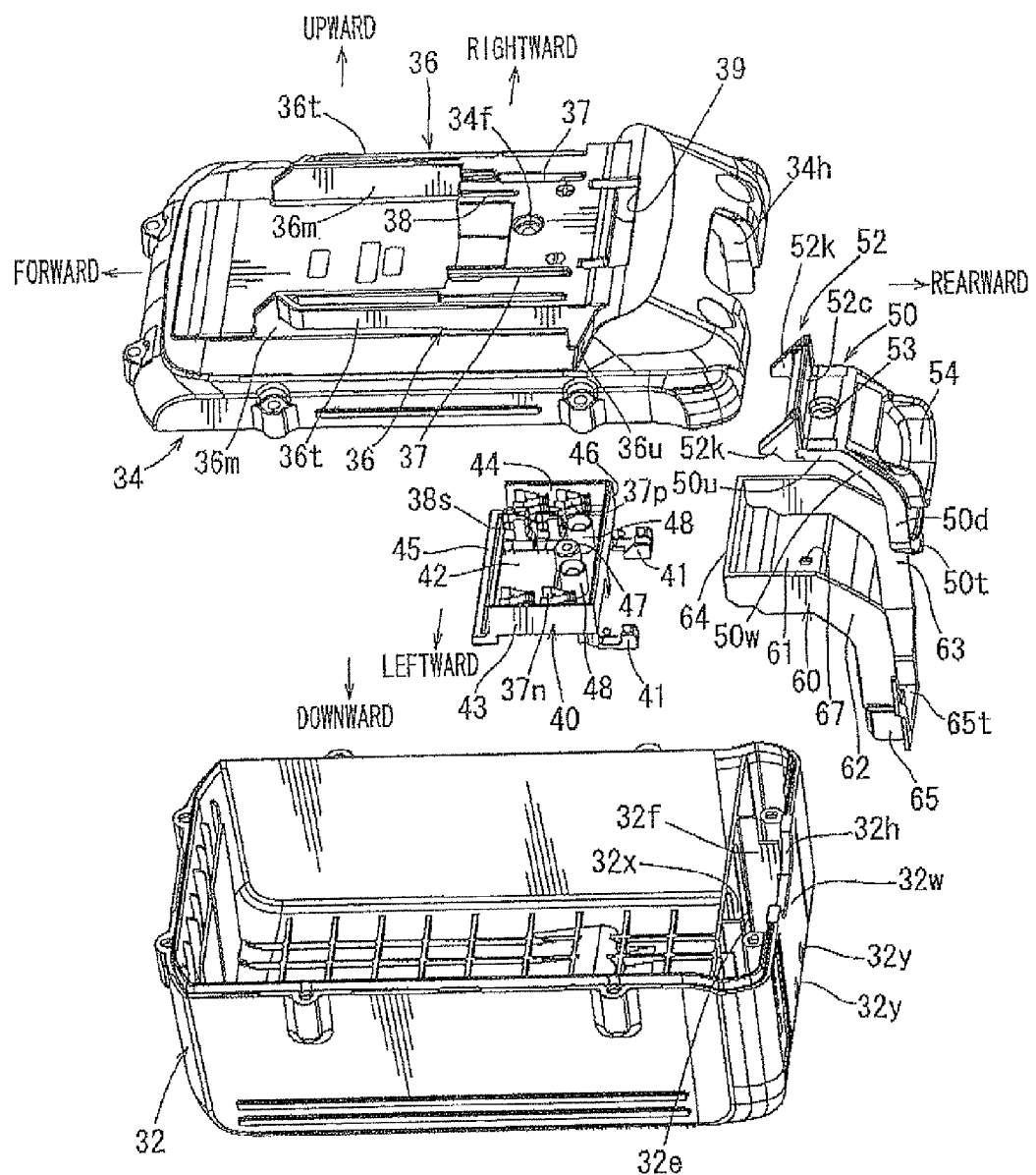
FIG. 3 is an exploded perspective view of a battery housing of the tool battery.

Referring to FIGS. 2 and 3, a tool battery 30 generally includes a plurality of battery cells S (hereinafter simply referred to as "battery cells S"), a housing body 32 having an upper opening and receiving the battery cells S therein, and a lid 34 for closing the upper opening of the housing body 32. Each of the housing body 32 and the lid 34 has a substantially rectangular shape as viewed in plan view. The lid 34 is fixedly mounted to the housing body 32 by using a plurality of screws 35 at eight positions along its peripheral portion. The housing body 32 and the lid 34 constitute a battery housing.

As shown in FIG. 3, a pair of left and right slide rails 36 are formed on the upper surface of the lid 34 and extend in the forward and rearward direction in parallel to each other. The left and right slide rails 36 are used for connection with left and right battery connection portions 26 of a tool body 20 of a power tool, respectively (see FIGS. 7 and 8). The slide rails 36 serve as a slide connection mechanism. Each of the slide rails 36 includes a rail body 36$m$ and a Lateral liner projection 36$t$ protruding laterally outwardly from the outer side surface of the rail body 36$m$ by a given distance. Stoppers 36$u$ are formed on the upper surface of the lid 34 at positions proximal to the rear ends of the slide rails 36.

As shown in FIGS. 1 and 3, a pair of left and right guide slits 37 are formed in the rear portion of the upper surface of the lid 34 in parallel to each other and are positioned between the left and right slide rails 36. The guide slits 37 are configured to allow insertion of plate-like terminals (not shown) of the tool body 20 from the front side, respectively. As shown in FIG. 1, a positive electrode 37$p$ and a negative electrode 37$n$ of the tool battery 30 are positioned below the right and left guide slits 37 (backside of the lid 34), respectively. A relatively short slit 38 is formed at a position laterally inwardly of the right guide slit 37 and is configured to allow insertion of a signal terminal (not shown) of the tool body 20 from the front side. A signal electrode 38$s$ of the tool battery 30 is positioned below the slit 38 (backside of the lid 34).

Further, at the rear portion of the upper surface of the lid 34, a claw opening 39 having a substantially U-shape in plan view is formed at a position on the rear side of the left and right guide slits 37 and is configured to allow protrusion of a lock claw 52 of a hook 50 therein to. The hook 50 selves as a lock member for looking the tool battery 30 against the tool body 20 not to slide relative thereto as will be explained later. The hook 50 is accommodated within a space defined between the rear portions of the housing body 32 and the lid 34 and is biased in such a direction that the lock claw 52 protrudes upwardly from the claw opening 39.

Figure 7:
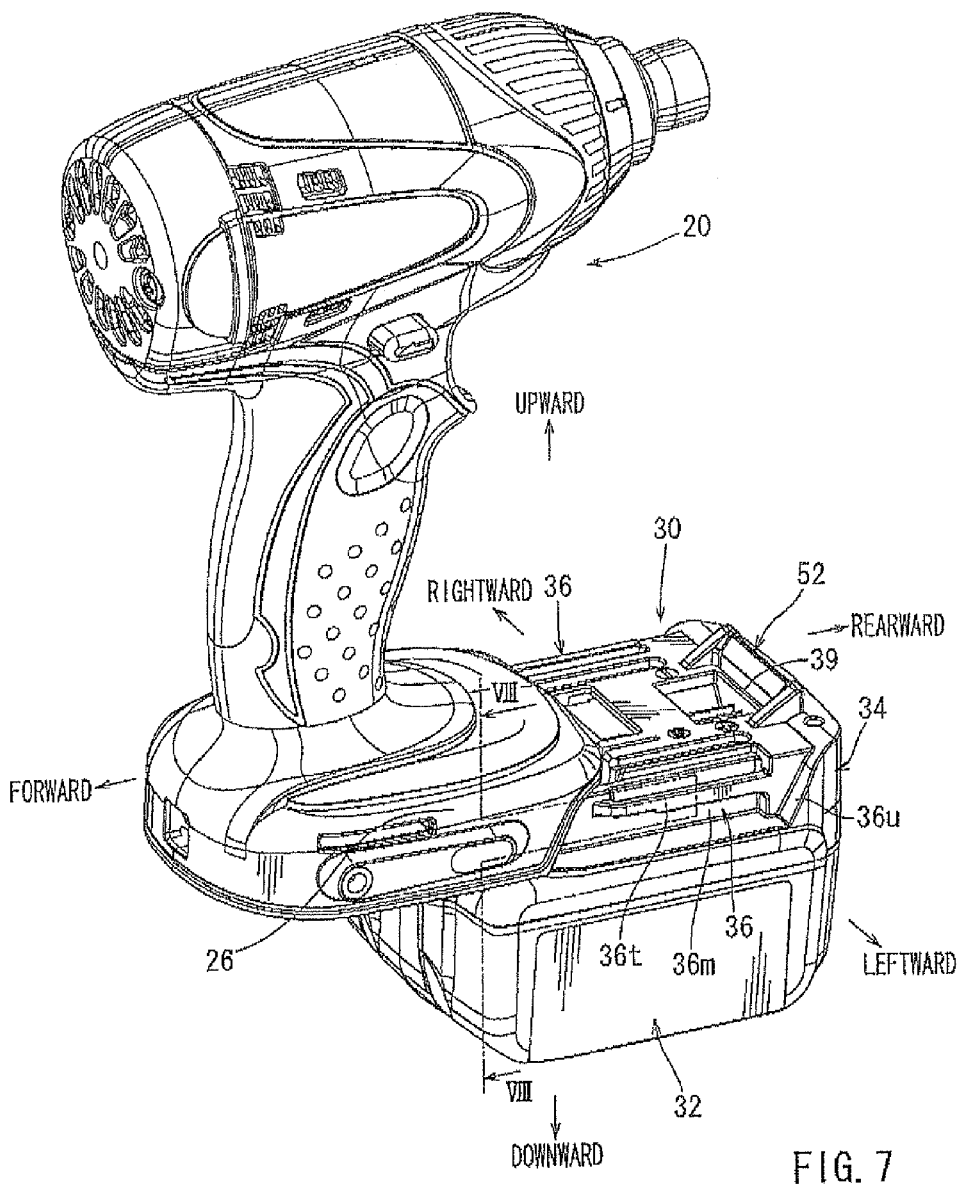
FIG. 7 is a perspective view showing the operation for connecting the tool battery to a tool body of a power tool.
Figure 8:
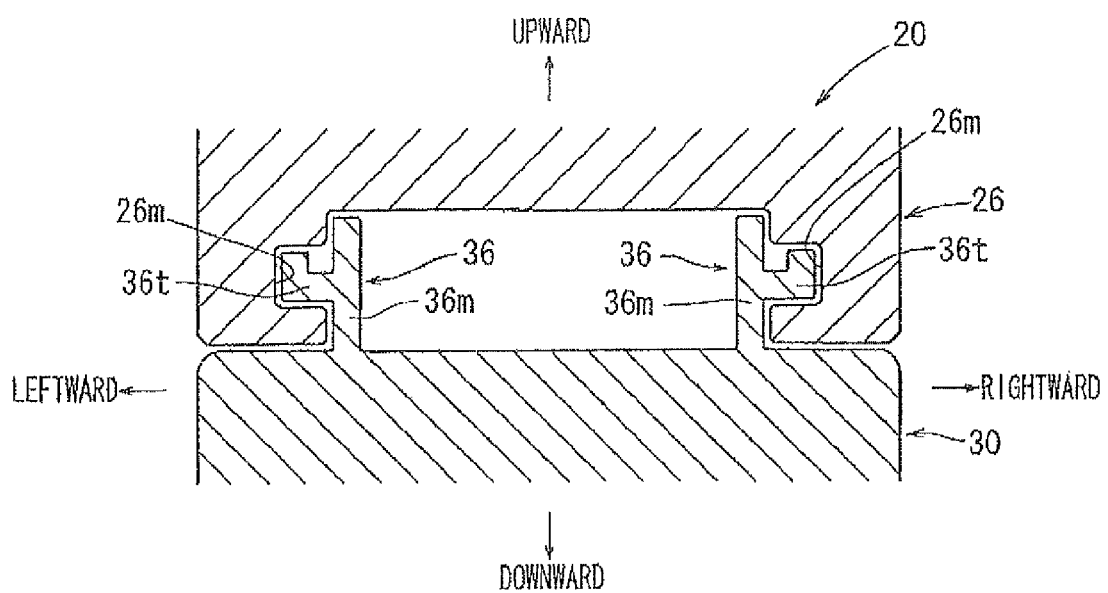
FIG. 8 is a vertical sectional view taken along line in FIG. 7 and showing the connecting structure for connecting the tool battery to the tool body.

In order to connect the tool battery 30 to the tool body 20, the front ends of the lateral liner projections 36t formed on the left and right slide rails 36 are engaged with left and right grooves 26m formed within the battery connecting portion 26 (see FIGS. 7 and 8). Each of the left and right grooves 26 in has a rectangular cross sectional configuration as shown in FIG. 8. Then, with the engaging state of the lateral linear projections 36t with the left and right grooves 26m maintained, the tool battery 30 is moved to slide along the tool body 20 in the forward direction (leftward as viewed in FIG. 7). Therefore, the tool battery 30 is mechanically connected to the tool body 20, and at the same time the left and right terminals of the tool body 20 are electrically connected to the positive electrode 37p and the negative electrode 37n of the tool battery 30. When the tool battery 30 has been slid to a limit position, the lock claw 52 of the hook 50 engages a lock wall (not shown) formed on the tool body 20. As a result, the tool battery 30 is locked against the tool body 20 not to slide relative thereto.

When the user presses the hook 50 downward against the biasing fore; the lock claw 52 moves downwardly not to protrude upward from the claw opening 39, so that the lock condition of the tool battery 30 is released.

Hook and Hook Accommodation Chamber

Figure 4:
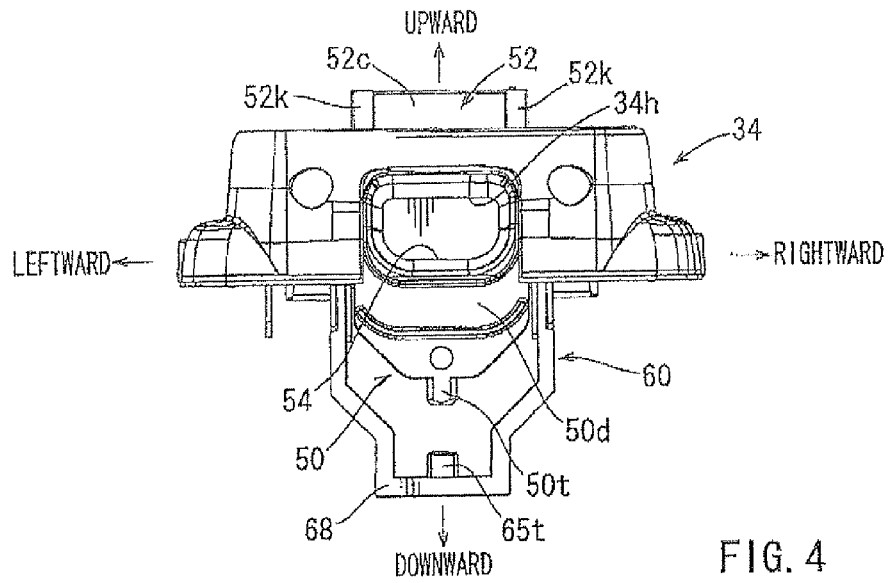
FIG. 4 is a rear view of the battery housing and showing a lid, a hook, etc.
Figure 5:
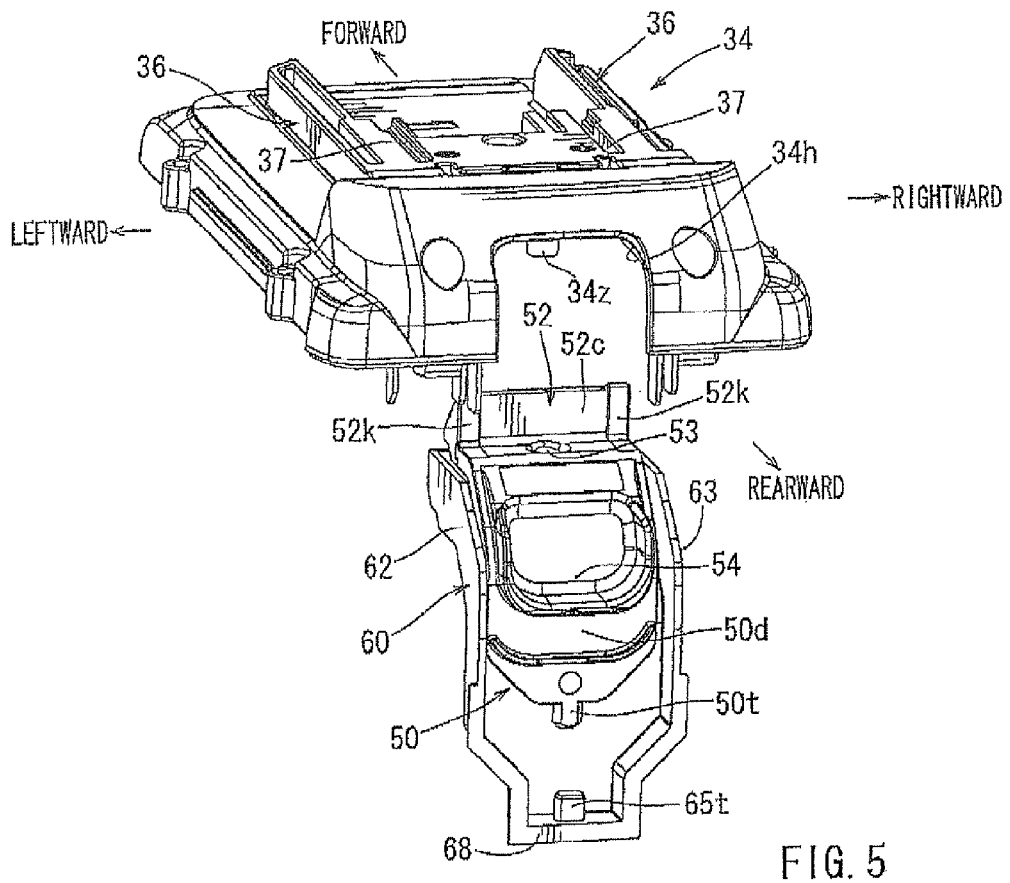
FIG. 5 is an exploded perspective view of the lid, the hook, etc. as viewed from the rear upper side.

As noted above, the hook 50 serves to took the tool battery 30 not to slide relative to the tool body 20. As shown in FIG. 3, the hook 50 includes an upper portion 50u, a curved portion 50w and a lower vertical wall portion 50d. The upper portion 50u has a horizontal upper surface. The lock claw 52 protrudes upward from the front end of the upper surface of the upper portion 50u. The lock claw 52 includes a pair of left and right lock pieces 52k and a vertical plate 52c connecting between the left and right lock pieces 52k, so that the lock claw 52 has a substantially U-shape in plan view. A guide hole 53 is formed centrally of a portion having the horizontal upper surface of the upper portion 50 on the rear side of the lock claw 52. An operation portion 54 is formed at a boundary region between the curved portion 50w and the lower vertical wall portion 50d. A finger or fingers of the user can press the operation portion 54 downwardly for moving the hook 50 downwardly for releasing the lock condition. To this end, the operation portion 54 is configured to have a substantially U-shape for partially surrounding the user's finger or fingers from below. As shown in FIGS. 4 and 5, a projection 50t protrudes downwardly from the lower end of the vertical wall portion 50d and is configured to fit with one end (upper end) of a coil spring 56 (see FIG. 2).

A vertical guide pin 34z (see FIGS. 2 and 6) is formed on the rear portion of the ceiling surface of the lid 34 and is inserted into the guide hole 53 of the upper portion 50u of the hook 50, so that the hook 50 can move vertically along the guide pin 34z. In this connection, the hook 50 is vertically movably received within a hook accommodation member 60 that defines a hook accommodation chamber as will be explained later. The hook accommodation member and the hook accommodation chamber may be called as a "lock accommodation member" and a "lock accommodation chamber", respectively.

As shown in FIG. 3, the hook accommodation member 60 is configured as a container having an upper opening. The shape of the hook accommodation chamber 60 as viewed from a lateral side substantially conforms to the shape of the hook 50 as viewed from the same direction. The hook accommodation member 60 has a bottom plate portion 61, a pair of left and right side plate portions 62 and 63, an upper vertical plate portion 64 and a lower plate portion 65. The distance between the left and right side plate portions 62 and 63 is set to be substantially equal to the width of the hook 50 (for example, see FIG. 5). Therefore, the hook 50 can move vertically while being guided by the vertical guide pin 34z of the lid 34 and also by the left and right side plate portions 62 and 63 of the hook accommodation member 60. A projection 65t is formed on the lower plate portion 65 positioned at the lower end of the hook accommodation member 60. The projection 65t is positioned so as to be opposed to the projection 50t of the hook 50 and is fitted with the other end (lower end) of the coil spring 56 (see FIG. 2). Therefore, the hook 50 is normally biased upwardly by the coil spring 56 interposed between the projection 50t of the hook 50 and the projection 65t of the hook accommodation member 60.

Figure 6:
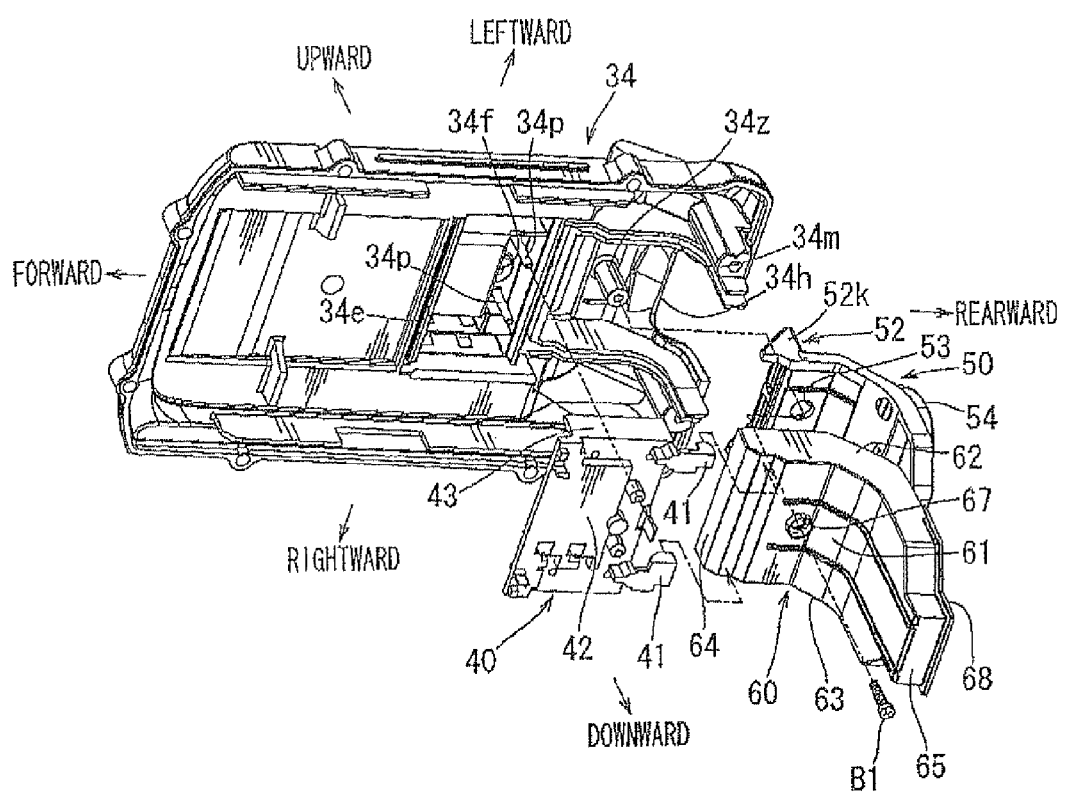
FIG. 6 is an exploded perspective view of the lid, the hook, etc. as viewed from the lower side.

As shown in FIG. 6, a seal recess 34m is formed in the rear portion of the ceiling surface of the lid 34 in such a way to surround the vertical guide pin 34z from its three sides or the front, left and right sides. The vertical plate portion 64 and the left and right side plate portions 62 and 63 of the hook accommodation member 60 are fitted into the seal recess 34m from below. A screw insertion hole 67 is formed in the bottom plate portion 61 at a position opposed to the vertical guide pin 34z in the state that the upper vertical plate portion 64 and the left and right side plate portions 62 and 63 are fitted into the seal recess 34m. The vertical guide pin 34z is formed with a threaded hole that extends along the axial direction of the vertical guide pin 34z and has the same size as the screw insertion hole 67.

With the above arrangement, by using a screw B1, the hook accommodation member 60 can be mounted to the vertical guide pin 34z that extends from the rear portion of the ceiling surface of the lid 34.

Thus, in order to mount the hook 50 and the hook accommodation member 60 to the rear portion of the ceiling surface of the lid 34, the hook 50 is first inserted into the hook accommodation member 60, and thereafter, opposite ends of the coil spring 56 are fitted with the projection 50t of the hook 50 and the projection 65t of the hook accommodation member 60. Subsequently, the vertical guide in 34z of the lid 34 is inserted into the guide hole 53 of the hook 50 so that the lock claw 52 of the hook 50 is inserted into the claw opening 39 of the lid 34 so as to protrude upward from. At the same time, as shown in FIG. 4, the operation portion 54 of the hook 50 is inserted into an operation opening 34h formed in a manner like a notch in the rear end surface of the lid 34.

Next, the upper vertical plate portion 64 and the left and right side plate portions 62 and 63 of the hook accommodation member 60 are fitted into the seal recess 34m, and the screw 131 is then inserted into the screw insertion hole 67 of the hook accommodation member 60 and engaged with the threaded hole formed in the vertical guide pin 34z extending from the rear portion of the ceiling surface of the lid 34 (see FIG. 2). Hence, the hook accommodation member 60 is fixed in position relative to the rear portion of the ceiling surface of the lid 34. In this state, as shown in FIG. 4, the lock claw 52 protrudes from the claw opening 39 of the lid 34 by the biasing force of the coil spring 56 (not shown in FIG. 4) applied to the hook 50, and at the same time, the operation portion 54 is held at its uppermost position (lock position), where the operation portion 54 is positioned within the operation opening 34h of the lid 34. Pressing the operation portion 54 of the book 50 downward against the biasing force of the coil spring 56 moves the hook 50 downward, so that the lock claw 52 moves to a position not to protrude upward from the claw opening 39. As a result, the hook 50 can be held at the lock releasing position.

As shown in FIG. 4, the lower half of the hook accommodation member 60 extends downward from the lower opening of the lid 34 in the state that the hook accommodation member 60 is fixedly mounted to the rear portion of the ceiling surface of the lid 34. The lower half of the hook accommodation member 60 is positioned within the rear portion of the housing body 32 as shown in FIG. 2. As shown in FIGS. 4 and 5 a flange portion 68 having a predetermined width is formed along the peripheral edge of the lower portion of the opening of the hook accommodation member 60, which extends downward from the lower opening of the lid 34.

As shown in FIG. 3, a left partition plate 32e, a right partition plate 32f, a front partition plate 32x and a rear vertical wall 32w of the housing body 32 define an accommodation space for accommodating the lower half of the hook accommodation member 60 within the rear portion of the housing body 32. A slit-like recess 32m is formed in the inner wall of the accommodation space for fitting with the flange portion 68 of the accommodation member 60. The recess 32m has left and right vertical portions and a horizontal portion. The left and right vertical portions extend along boundary lines between the rear vertical wall 32w and the left and right partition walls 32e and 32f. The horizontal portion extends along a boundary line between the rear vertical wall 32w and a bottom 32b of the accommodation space. Therefore, as the lower half of the hook accommodation member 60 is inserted into the accommodation space, the flange portion 68 of the hook accommodation member 60 is fitted into the recess 32m, and the opening of the hook accommodation member 60 is closed by the rear vertical wall 32w of the housing body 32.

In this way, the inside of the hook accommodation member 60 accommodating the hook 50 and a portion of the inner space of the housing body 32 accommodating the battery cells S are completely separated from each other by the hook accommodation member 60 and the front partition plate 32x of the housing body 32.

As shown in FIG. 3, an operation opening 32h is formed in a manner like a notch in the upper end of the rear vertical wall 32w of the housing body 32. The operation opening 32h is positioned so as to be in series with the operation opening 34h of the lid 34. Therefore, the operation member 54 of the hook 50 can move vertically within a range permitted by an open area defined by the operation opening 34h and the operation opening 32h.

As shown in FIG. 3, communication holes 32y are formed in the lower end of the rear vertical wall 32w for communication between the inside of the hook accommodation member 60 and the outside of the housing body 32. Therefor; in the event that water has accidentally entered the hook accommodation member 60, water may be easily rapidly discharged to the outside.

In this way, a hook accommodation chamber is defined by the hook accommodation member 60, the backside wall (ceiling wall) of the lid 34 and the rear vertical wail 32w of the body housing 32. The communication holes 32y serve as a discharge device for discharging water from the hook accommodation chamber.

Electrode Accommodation Chamber

As shown in FIGS. 3 and 6, an electrode accommodation member 40 is provided for accommodating the positive electrode 37p, the negative electrode 37n and the signal electrode 38s of the tool battery 30. The electrode accommodation member 40 is removably mounted to the ceiling surface of the lid 34 at a position on the front side of the hook accommodation member 60. As shown in FIG. 3, the electrode accommodation member 40 is configured as a rectangular container having upper and front openings. The electrode accommodation member 40 has a bottom plate portion 42, left and right side plate portions 43 and 44, and a rear vertical plate portion 46. The positive electrode 37p, the negative electrode 37a and the signal electrode 38s are mounted to the bottom plate portion 42. More specifically, the positive electrode 37p is mounted to the right side portion of the bottom plate portion 42, the signal electrode 38s is positioned adjacent to and on the left side of the positive electrode 37p, and the negative electrode 37n is mounted to the left side portion of the bottom plate portion 42. Left and right guide portions 48 are formed on the rear portion of the bottom plate portion 42 at a position adjacent to both of the positive and negative electrodes 37p and 37n. The left and right guide portions 48 are formed with guide holes for receiving left and right positioning pins 34p (see FIG. 6) protruding downwardly from the ceiling surface of the lid 34. A connection pin 47 having a threaded hole formed therein is formed on the bottom plate portion 42 at a position between the guide portions 48. At the lower edge of the front opening of the electrode accommodation member 40, a linear projection 45 is formed to extend in the right and left direction at a level lower than the electrodes 37p, 37n and 38s.

As shown in FIG. 6, a linear groove 34e is formed in the ceiling surface of the lid 34 for engaging the linear projection 45 of the electrode accommodation member 40. In addition, a threaded insertion hole 34f is formed in the ceiling surface of the lid 34 at a position corresponding to the threaded hole formed in the connection pin 47 (see FIGS. 3 and 6).

In order to mount the electrode accommodation member 40 to the lid 34, the positioning pins 34p extending from the ceiling surface of the lid 34 are inserted into the guide holes formed in the guide portions 48 of the electrode accommodation member 40, and the linear projection 45 is then fitted into the linear groove 34e formed in the ceiling surface of the lid 34. Thereafter, a screw B2 is inserted into the screw insertion hole 34f and screwed into the threaded hole of the connection pin 47. In this way, the electrode accommodation member 40 is removably mounted to the lid 34 by means of the screw B2.

In this way, the ceiling surface (backside surface) of the lid 34 and the electrode accommodation member 34 serve to define an electrode accommodation chamber for accommodating the electrodes 37p, 37n and 38s.

Advantages of Tool Battery

According to the tool battery 30 of the above example, the hook accommodation member 60 is disposed within the battery housing formed by the housing body 32 and the lid 34. The hook accommodation member 60 accommodates the hook 50 such that the hook 50 can move between the lock position, where the lock claw 52 of the hook 50 protrudes outward from the claw opening 39 of the lid 34, and the lock release position, where the lock claw 52 is positioned not to protrude upward from the claw opening 39. Therefore, if water accidentally enters the battery housing via any of the claw opening 39, the operation openings 34h and the operation opening 32h of the lid 34, water may be stored within the hook accommodation member 60 or within the hook accommodation chamber. In addition, the space storing the battery cells S within the battery housing is separated from the hook accommodation chamber by the hook accommodation member 60, etc. Therefore, even in the event that water has entered into the hook accommodation chamber, water may not reach the space that accommodates the battery cells S. As a result, it is possible to prevent the tool battery 30 from causing any trouble due to adhesion of water to the battery cells S.

Further, a discharge device (communication holes 32y) is provided at the bottom portion of the hook accommodation chamber for discharging water entering the hook accommodation chamber. Therefore, it is possible to quickly discharge water from within the hook accommodation chamber.

Further, the hook accommodation chamber is defined by fitting the hook accommodation member 60 into the battery housing that is formed by the lid 34 and the housing body 32. Therefore, the battery housing can be easily molded in comparison with the case where the hook accommodation chamber is defined a member that is molded integrally with the battery housing.

Further, because the electrode accommodation member 40 for accommodating the electrodes 37p, 37n and 38s, to which the corresponding terminals of the tool body 20 are connected, is mounted to the ceiling surface of the lid 34 (inside of the battery housing). Therefore, even in the event that water accidentally enters the electrode accommodation member 40 (or the electrode accommodation compartment), water may be stored within the electrode accommodation member 40 and may not reach the space accommodating the battery cells S.

Possible Modifications

Figure 9:
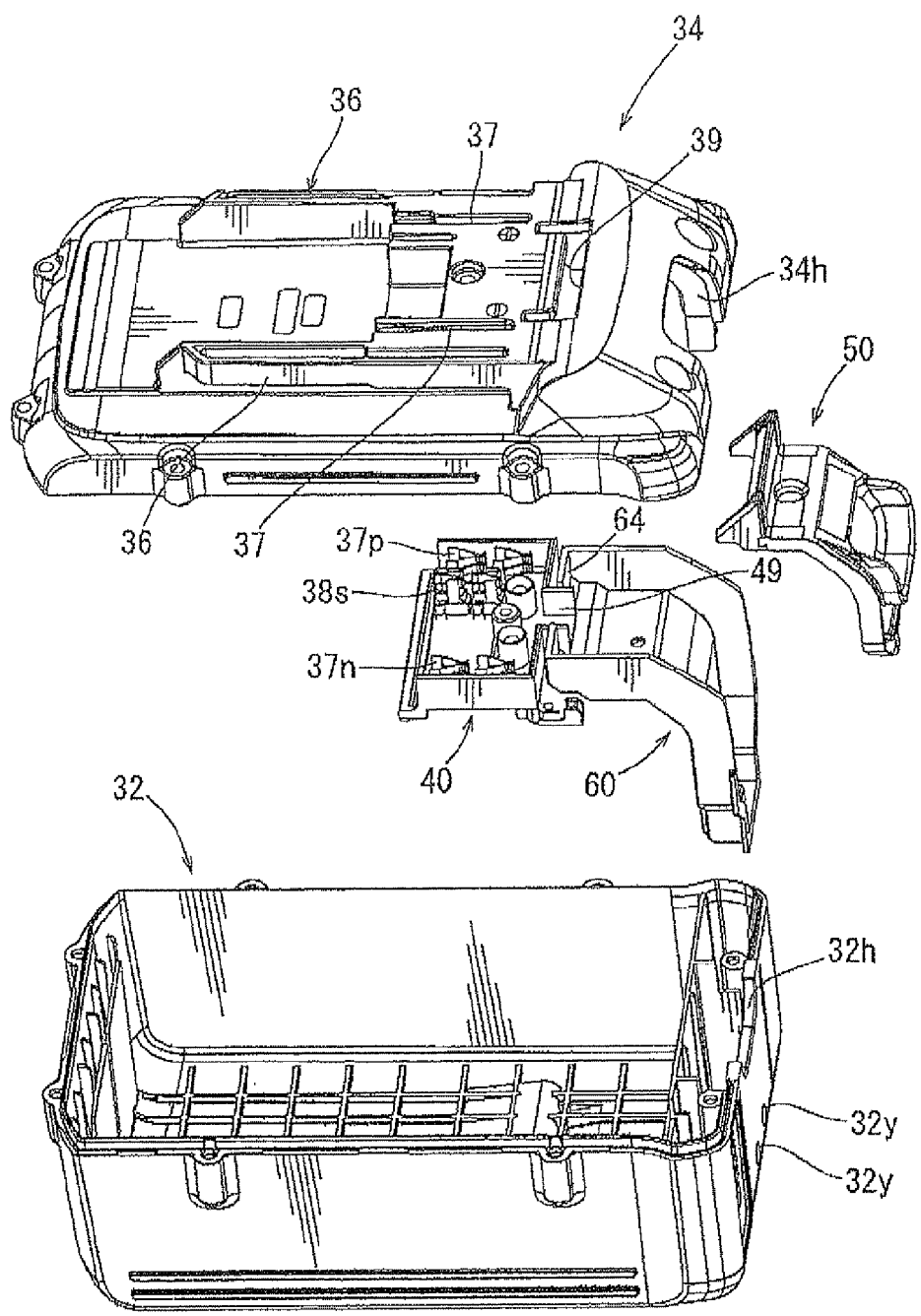
FIG. 9 is an exploded perspective view of a battery housing of a tool battery according to another example.
Figure 10A:
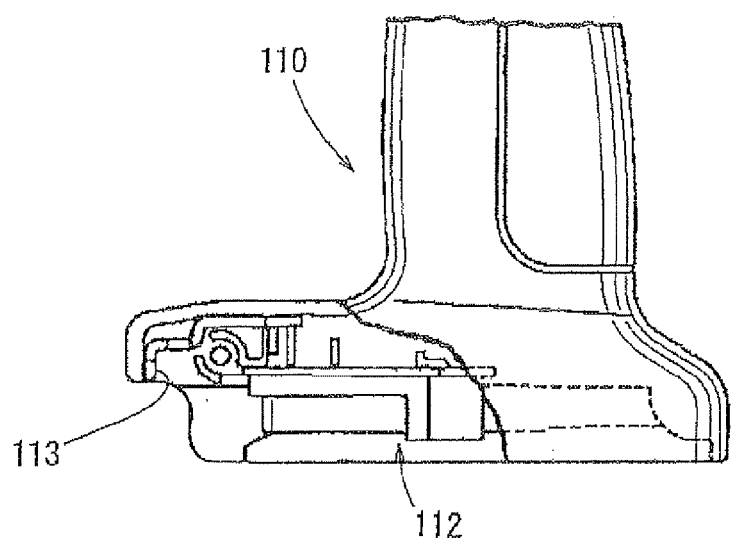
FIG. 10(A) is a side view of a battery connecting portion of a tool body of a known power tool.
Figure 10B:
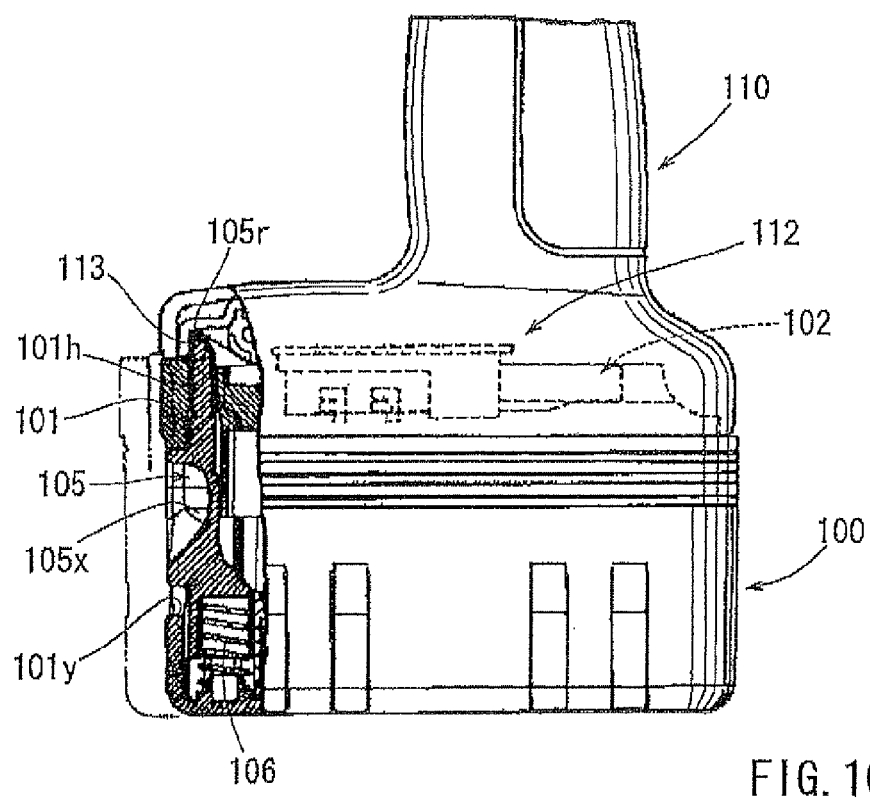
FIG. 10(B) is a side view showing the connecting state between the tool body of the known power tool and a known tool battery.

The above example may be modified in various ways. For example, although the hook accommodation member 60 and the electrode accommodation member 40 are independent members from each other, a communication passage portion 49 may be formed on the rear end of the electrode accommodation member 40 as shown in FIG. 9, so that water entering the electrode accommodation member 40 may flow into the hook accommodation member 60. Therefore, water entering the electrode accommodation member 40 can be discharged to the outside via the communication holes 32y together with water entering the hook accommodation member 60.

Further, although the hook 50 having the lock claw 52 is used for locking and unlocking the battery housing to the tool body 20 in the above example, the hook 50 may be replaced with any other lock member as long as it can lock the battery housing against the tool body 20.

Furthermore, seal members may be provided between connecting portions of the hook accommodation member 60 and the lid 34 and/or between connecting portions of the electrode accommodation member 40 and the lid 34, so that it is possible to further reliably prevent water from entering the accommodation space for the battery cells S.

What is claimed is:

1. A tool battery comprising:
a battery housing;
a hook disposed within the battery housing configured to lock the battery housing against a tool body of a power tool;
a hook accommodation chamber defined within the battery housing and accommodating the hook such that the hook can move between a lock position for locking the battery housing against the tool body and a lock release position for releasing the battery housing from being locked against the tool body;
a battery cell accommodation chamber defined within the battery housing for accommodating battery cells; and
a first partitioning device partitioning between the hook accommodation chamber and the battery cell accommodation chamber, so that when water enters the hook accommodation chamber, water is prevented from entering further into the battery cell accommodation chamber;
wherein a discharge hole is formed in a bottom portion of the hook accommodation chamber, so that water entering the hook accommodation chamber is discharged from the hook accommodation chamber via the discharge hole, and
wherein the bottom portion of the hook accommodation chamber is arranged such that the hook moves toward the bottom portion when moving to the lock release position.

2. The tool battery as in claim 1, further comprising:
an electrode accommodation chamber defined within the battery housing and accommodating electrodes for connecting with corresponding terminals of the power tool body,
a second partitioning device partitioning between the electrode accommodation chamber and the battery cell accommodation chamber, so that when water enters the electrode accommodation chamber, water is prevented from entering further into the battery cell accommodation chamber.

3. The tool battery as in claim 2, wherein the hook accommodation chamber and the electrode accommodation chamber communicate with each other.

4. The tool battery as in claim 1, wherein the first partitioning device includes a hook accommodation member, and wherein the hook accommodation member is a separate member from the battery housing and is fitted into the battery housing, so that the hook accommodation chamber is defined as a substantially closed space by the hook accommodation member.

5. The tool battery as in claim 4, wherein the battery housing includes a housing body having an upper opening and a lid detachably mounted to the housing body for closing the upper opening, and wherein the hook accommodation member is mounted to the lid, so that the hook accommodation chamber is defined between the hook accommodation member, the lid and a part of the housing body.

6. The tool battery as in claim 4, wherein the hook accommodation member is detachably mounted within the battery housing.

7. The tool battery as in claim 4, further comprising a biasing device disposed between the hook and the hook accommodation member and biasing the hook toward the lock position.

8. The tool battery as in claim 4, further comprising a guide device provided on the battery housing, so that the hook can move between the lock position and the lock release position under the guide of the guide device.

9. The tool battery as in claim 8, wherein the guide device comprises a guide pin protruding from an inner wall of the battery housing, and wherein the hook accommodation member is detachably mounted to the guide pin.

10. The tool battery as in claim 2, wherein the second partitioning device includes an electrode accommodation member, wherein the electrode accommodation member is a separate member from the battery housing and is mounted within the battery housing, so that the electrode accommodation chamber is defined as a substantially closed space by the electrode accommodation member.

11. The tool battery as in claim 10, wherein the battery housing includes a housing body having an upper opening and a lid detachably mounted to the housing body for closing the upper opening, and wherein the electrode accommodation member is mounted to the lid, so that the electrode accommodation chamber is defined between the electrode accommodation member and the lid.

12. The tool battery according to claim 1, wherein:
- the battery housing includes a slide connection mechanism configured to be slidably connected to a tool body of a power tool;
- the hook has a lock claw and an operation portion, the lock claw being configured to lock the battery housing against the tool body not to slide relative thereto, and the operation portion being operable to release the lock claw from locking against the tool body;
- the battery housing has a claw opening and an operation opening, the claw opening permitting the lock claw to protrude to the outside of the battery housing via the claw opening, and the operation opening permitting the operation portion from being exposed to the outside of the battery housing at the operation opening;
- when the hook is positioned at the lock position, the lock claw protrudes from the claw opening; and
- when the hook is positioned at the lock releasing position, the lock claw does not protrude from the claw opening.

\* \* \* \* \*